May 5, 1942.  A. A. PROPERNICK  2,282,089
ELECTRIC APPLIANCE
Filed March 29, 1940   3 Sheets-Sheet 1
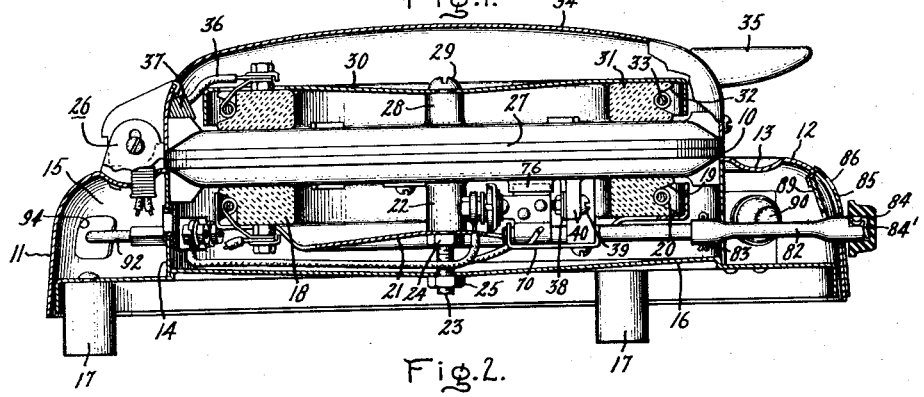
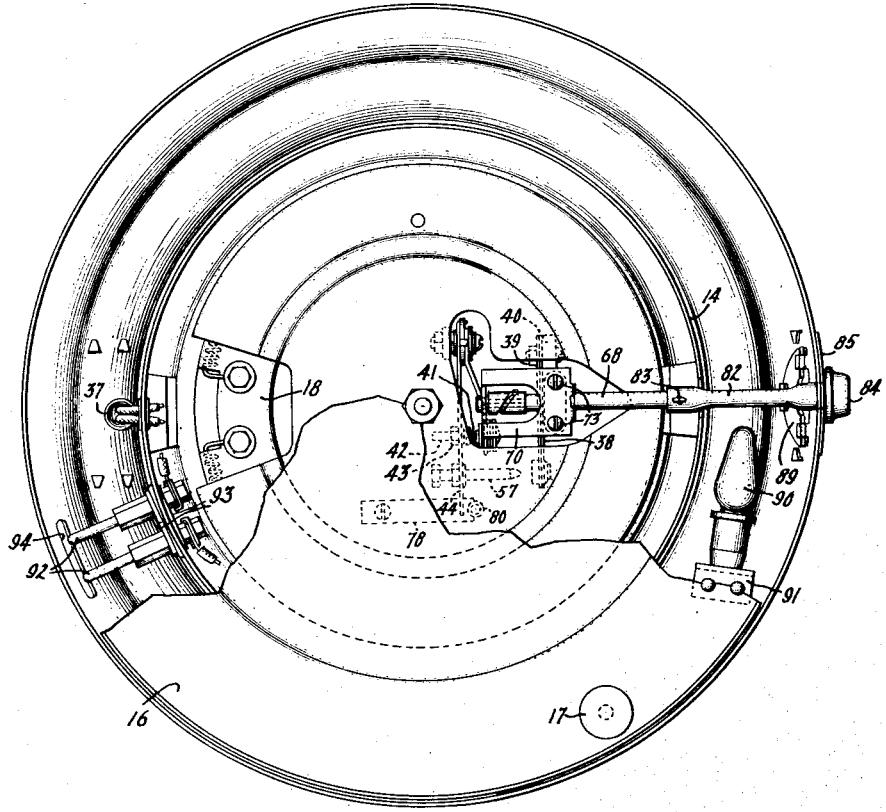
Inventor:
August A. Propernick
by Harry E. Dunham
His Attorney.

May 5, 1942.   A. A. PROPERNICK   2,282,089
ELECTRIC APPLIANCE
Filed March 29, 1940   3 Sheets-Sheet 2
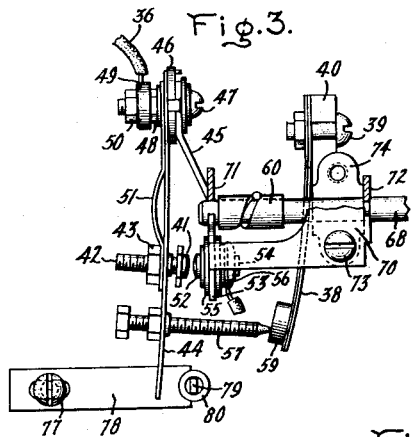
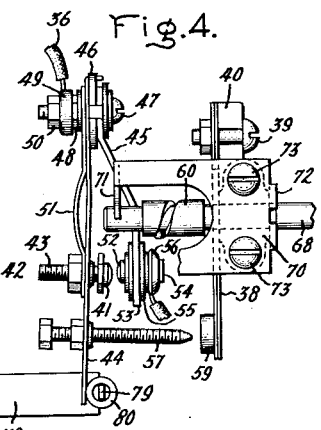
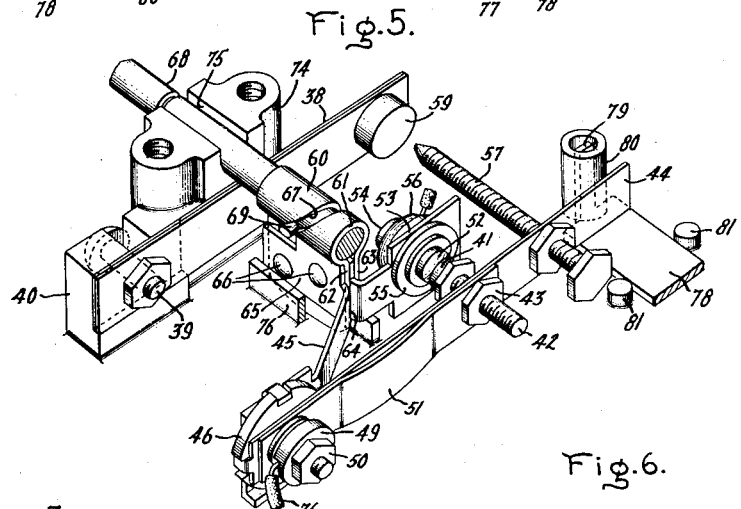
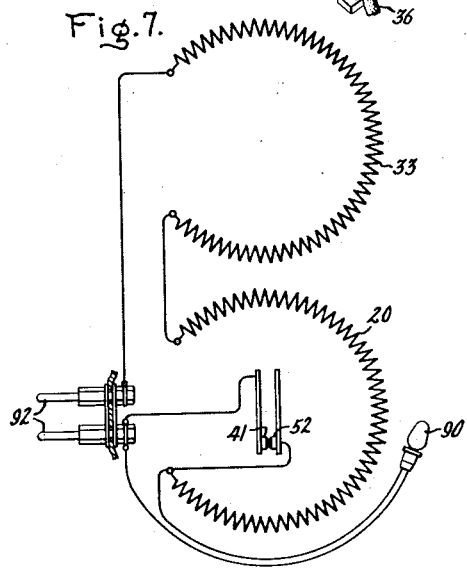
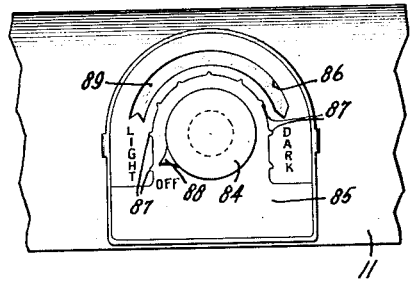
Inventor:
August A. Propernick,
by Harry E. Dunham
His Attorney.

May 5, 1942.  A. A. PROPERNICK  2,282,089
ELECTRIC APPLIANCE
Filed March 29, 1940   3 Sheets—Sheet 3
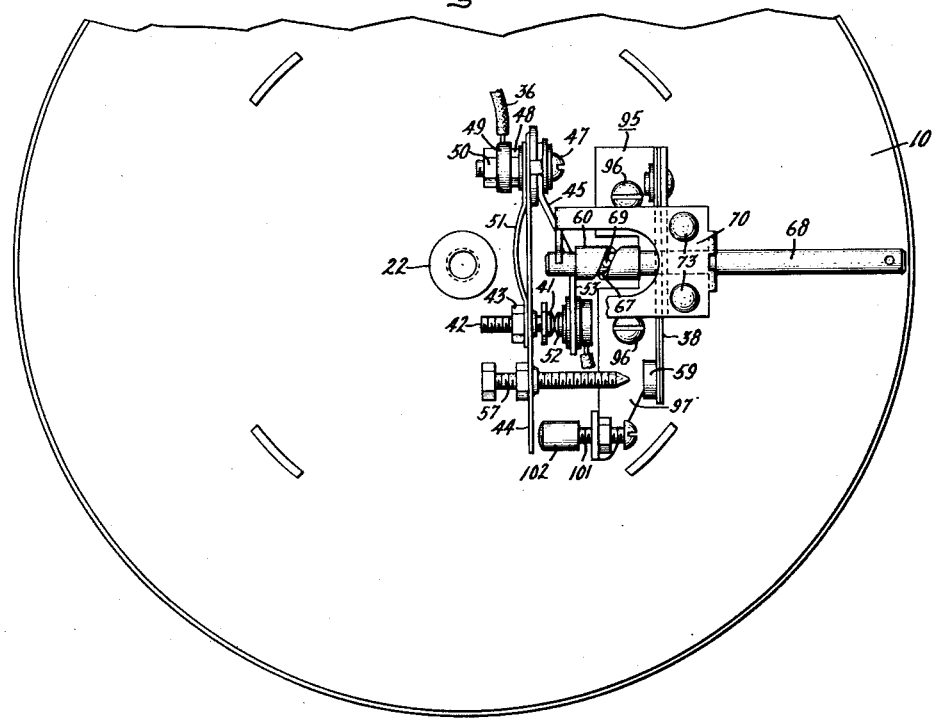
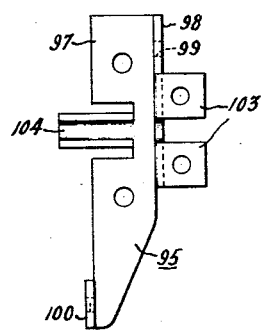 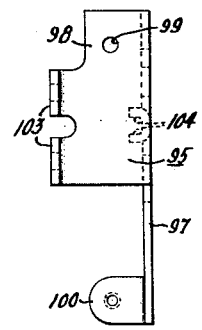
Inventor:
August A. Propernick,
by Harry E. Dunham
His Attorney.

Patented May 5, 1942

2,282,089

UNITED STATES PATENT OFFICE 2,282,089

ELECTRIC APPLIANCE

August A. Propernick, Bridgeport, Conn., assignor to General Electric Company, a corporation of New York Application March 29, 1940, Serial No. 326,719

2 Claims. (Cl. 200—138)

This invention relates to an electric appliance and more particularly to an electric cooking appliance, such as a waffle iron, and has for its primary object the provision of a new and improved control and signal arrangement for such an appliance.

While this invention is particularly applicable to electric waffle irons and will be described in detail as a control and signal arrangement for such a cooking appliance, it will be understood that the control and signal arrangement of this invention may be used with other cooking appliances and particularly other cooking appliances having upper and lower cooking members, for example, electric sandwich grills.

It is a specific object of this invention to provide in an electric cooking appliance, such as waffle irons or the like, a new and improved control which is rugged in construction, comprises relatively few parts, is efficient and accurate in operation, and is adjustable over a relatively wide range by means which control, the relative position between a circuit controlling device and a temperature responsive element.

It is a further object of this invention to provide in an electric cooking appliance a new and improved control device having improved means for effecting a manually settable off position so that an on and off switch for the cooking appliance is incorporated in the control device.

In the use of electric waffle irons it is well known that the character and color of the waffle produced depends upon the length of time and the temperature at which it is cooked. It is, therefore, among the specific objects of this invention to provide an inexpensive, readily assembled, and easily operated control device for a waffle iron by which the temperature of the waffle grids may be controlled over a wide range so that the color and hence the degree of cooking of the waffle may be regulated to suit the predilection of the consumer.

In electric cooking appliances of the type under discussion, it is customary to provide visible signal means for indicating when the cooking plates of the appliance have attained a cooking temperature and when the food on the cooking plate has been cooked the desired amount. It has been proposed to use electric lamps for the visible signal means but these lamps have not been entirely successful due to the fact that they have been mounted on brackets which are secured directly to one of the cooking plates thereby subjecting the lamp to the high temperatures attained by the cooking plate in the operation of the appliance. It is therefore a further specific object of this invention to provide an improved visible signal means by which the aforementioned difficulty is overcome and the life of the signal lamp is substantially increased.

Further objects and advantages of this invention will appear as the following description proceeds and the features of novelty which characterize this invention will be set forth in the claims appended to and forming a part of the specification.

For a more complete understanding of my invention, reference should be had to the accompanying drawings in which Fig. 1 is an elevation partly in section of a cooking appliance such as a waffle iron provided with my improved control and indicating means; Fig. 2 is a plan view partly broken away of the waffle iron shown in Fig. 1; Fig. 3 is a bottom view of my improved control device showing the control means in a different circuit controlling position from that shown in Fig. 2; Fig. 4 is a view similar to Fig. 3 showing the position of the elements of my improved control device when the contact assembly has been moved to the manually settable off position; Fig. 5 is an enlarged perspective of the control device looking in the direction of the bottom of the lower waffle casting shown in Fig. 1; Fig. 6 shows the escutcheon plate and control knob employed with my improved temperature adjusting means and signal arrangement; Fig. 7 is a circuit diagram showing the waffle iron circuit and the position of the control device and signal lamp therein; Fig. 8 is a bottom view of a lower waffle grid showing a modified form of my improved control means mounted thereon; Fig. 9 is a detailed plan view of the supporting brackets used with the modified form of control shown in Fig. 8; and Fig. 10 is a side elevation of the bracket shown in Fig. 9.

Referring to the drawings and particularly Figs. 1 and 2, I have shown my improved control and signal arrangement applied to a waffle iron having a lower waffle casting 10 which is supported on a circular base member having a side wall 11 and a top wall 12 in which is pressed a circumferential groove 13. Extending downwardly from the inside edge of the top wall 12 is a casing 14 which cooperates with the side wall 11 to form an annular chamber 15 in the base assembly. The casing 14 thereby divides the base of the waffle iron into two chambers and serves as a baffle or barrier to retard the flow of heat to the annular chamber 15. Arranged to close the bottom of the base member 10 is the base plate 16 and provided on the base plate is a plurality of leg members 17 made from some suitable heat insulating material which are adapted to support the waffle iron in an elevated position with respect to the table or other suitable supporting means upon which the iron is located. Provided on the lower waffle plate is a heating unit assembly which comprises an annular ring 18 of some suitable ceramic material which is provided with a circumferential groove 19 into which a suitable heating element 20 is adapted to lie. The heating unit assembly is secured to the lower waffle grid by means of the pressure plate 21. In order to secure the base plate 16 and the pressure plate 21 in their respective positions, a post 22 is provided centrally of the lower waffle casting which post supports a stud 23 on which a pair of nuts 24 and 25 are threaded to fasten the pressure plate and base plate respectively in position.

Hingedly secured to the base assembly by means of a suitable hinge assembly 26 is an upper grid assembly comprising an upper waffle casting 27 which is provided with a centrally located post 28 to which is secured by means of a screw 29 the upper pressure plate 30 for firmly securing to the grid 27 a heating unit assembly which comprises an annular ring 31 of a suitable ceramic material provided with a groove 32 at its periphery and a heating unit 33 located in the groove. Arranged to enclose the upper grid assembly is a casing or lid 34 to which is secured a suitable handle 35 for raising the assembly on its hinge 26. As shown in Fig. 7, the heating units for the upper and lower grids are electrically connected in series. The leads 36 for the upper heating unit are arranged to pass through the casing 34 and the hinge 26 to and into the base 10. A coiled spring member 37 which extends through the casing 14, base 10, hinge 26 and into the cover of the upper grid forms a resilient duct to protect the leads 36 from damage.

As previously described, this invention contemplates the provision of improved means for controlling the operation of the waffle iron in accordance with temperature changes of one of the waffle grids, preferably the lower. In effecting this improved control arrangement, I have provided a suitable temperature responsive element which in the preferred form of my invention is a bimetallic element 38 which is firmly secured by means of a nut and bolt 39 to a slotted boss 40 molded on the lower waffle casting. The bimetallic element 38 is adapted to move in accordance with temperature changes of the lower grid, the element being arranged so as to move to the left as shown in Figs. 2, 3 and 4 upon an increase in temperature of the lower waffle casting. Actuated in accordance with this movement of the bimetallic element 38 is a relatively movable contact 41 which is adjustably secured by means of a screw 42 and a lock nut 43 on a resilient contact arm 44 intermediate the ends thereof. The contact arm 44 is in turn secured at one end to a bracket 45, a suitable insulating disk 46 being provided between the end of the bracket 45 and the end of the contact arm 44. A bolt 47 and nut 48 are provided for securing the contact arm to the bracket and the bolt extends beyond the contact arm so as to form a terminal for one of the electrical leads to the control device, the terminal being completed by a cup washer 49 which receives the end of a lead and a second nut 50. In order to increase the current carrying capacity of the control device, a flat lead 51 having a relatively low resistance is arranged to extend between the binding post formed by the screw 47 and the adjusting screw 42 which supports the relatively movable contact 41.

Provided opposite the contact 41 and cooperating therewith to form switch means for the heating elements 20 and 33 is a relatively fixed contact 52 which is supported on a contact bracket 53 by means of a terminal stud 54. Insulating washers 55 are provided on each side of the bracket 53 in order to insulate the same electrically and a disk washer 56 is provided at the terminal end of the stud 54 in order to facilitate electrically connecting a second lead thereto.

Threadedly mounted on the contact arm 44 intermediate the adjustable contact screw 42 and the free end of the arm 44 is an elongated screw 57 which is locked in its adjusted position by means of a lock nut 58. The end of the screw 57 projects beyond the contact arm and is adapted to be engaged by an insulating disk 59 which is mounted on the free end of the bimetal element 38. From the description thus far, it will be observed that deflection of the bimetal element to the left, in response to an increase in temperature, from the position shown in Fig. 2 to the position shown in Fig. 3 will cause the insulating disk 59 to engage the end of the screw 57 so as to cause the contact arm 44 to be moved to the left and thereby move the contact 42 out of engagement with the relatively fixed contact 52.

In order to calibrate the control and thereby fix the maximum temperature at which the device will operate, the screw 57 may be moved so that the end thereof is closer to or farther away from the end of the bimetal blade and the insulating button mounted thereon. Such an adjustment controls the maximum amount of free movement required of the bimetal blade before the contact structure is moved to a different circuit controlling position and thereby controls the maximum settable temperature for the control.

In accordance with my invention, I have provided improved means for adjusting the temperature at which the circuit controlling means will be operated to open the heating circuit. As previously stated, my improved adjusting means is constructed and arranged so that the contact structure of the control may be bodily shifted laterally with respect to the bimetal element. In order to effect such a temperature adjusting means, the contact brackets 45 and 53 are adapted to be secured together to form a unitary assembly and this unitary assembly is adapted to be moved laterally by an improved cam device 60. Considering this structure more in detail and, referring to Fig. 5, it will be observed that the cam 60 has a substantially hairpin shape which includes a substantially circular portion 61 and parallel leg portions 62 and 63. The bracket 53 is provided with a flange portion 64 which is adapted to lie between the parallel leg portions of the cam and the bracket 46 is provided with a similar flange portion 65 which is adapted to lie outside of the leg portion 62. By means of a pair of rivets 66, the leg portions of the cam and the flange portions of the bracket are secured in their respective positions so that the cam supports both contact brackets and movement of the cam inwardly and outwardly causes a similar movement of the entire contact structure as a unit. In order to effect this lateral movement of the cam, a curved slot 67 is provided in the rounded portion 61 thereof and a shaft 68 having a pin 69 which tracks in the slot 67 is arranged to extend through the circular portion of the cam. By means of this construction, it will be observed that rotation of the shaft 68 will cause the pin 69 to move in the slot 67 and thus cause translation of the cam 60 and the contact structure secured thereto.

In order to secure the shaft 68 rotatably in its operative position, there is provided a bracket 70 having a vertically extending flange 71 and 72 at each end. Provided in the flange 71 is a bearing opening in which the end of the shaft is supported and provided in the flange 72 is a similar bearing opening which supports the shaft intermediate its ends. The bracket 70 with the shaft mounted thereon is secured by means of screws 73 to a boss 74 molded on the lower waffle grid, the boss being provided with a slot 75 in which the shaft 68 is adjusted to lie as shown in Fig. 5. Rotation of the cam member 60 with the shaft is prevented by the provision of a pair of spaced flanges 76, molded on the lower waffle grid, between which the ends of the leg portions 62 and 63 of the cam are adapted to lie as shown in Fig. 5.

With the shaft thus mounted on the waffle grid and the cam restrained from rotating, it will be observed that rotation of the shaft 68 clockwise, as viewed in Fig. 5, will cause the cam 60 and the contact structure connected thereto to move to the left so that a lower temperature setting will be maintained, that is, so that the end of the screw 57 will be moved closer to the end of the bimetal element.

In order to provide a manually settable off position as one setting within the operating range of the movement of the shaft 68, there is adjustably secured to the lower waffle plate by means of a screw 77 a stop bracket 78 which is provided with a vertically depending flange 79 upon which a circular stop member 80 is pressed. In order to prevent lateral movement of the stop bracket 78, a pair of studs 81 are molded on the lower waffle plate so as to lie on each side of the bracket as shown in Fig. 5. The stop member 80 is adapted to be engaged by the free end of the contact arm 44 so that movement of the arm to the right, as viewed in Figs. 3 and 4, or to the left, as viewed in Fig. 5, will be limited. Thus, considering the elements as shown in Fig. 5, rotation of the shaft in the clockwise direction causes movement to the left of the cam and hence a similar movement of the arm 45. So long as the movement of the arm is not sufficient to cause it to engage the stop 80, the position of the movable and fixed contacts relative to each other is undisturbed and the movement effects a different temperature setting for the control as described above. However, the stop 80 is positioned so that the arm 44 will engage it before the shaft has been rotated its full amount in the clockwise direction. Thus, with the arm against the stop, further movement to the left of this portion of the control upon further clockwise rotation is prevented, but movement to the left of the rest of the contact continues and hence the contact 52 is moved away from the contact 41 to open the circuit.

My improved control arrangement is constructed so that adjustment thereof may be made from outside the casing. In effecting this construction, an extension shaft 82 is secured to the end of the shaft 68 by means of a cotter pin 83. The shaft extension is adapted to extend through suitable openings provided in the casing 14 in the side wall 11 of the base and a suitable knob 84 is secured to the outer end thereof by means of a spring clip 84'. Provided on the side wall of the base member at the point where the shaft 82 extends therethrough is an escutcheon plate 85 which, as shown in Fig. 6, is provided with a curved opening 86 and notches 87 which cooperate with a pointer 88 provided on the knob to indicate relative settings of the control. As shown, the legends "off", "light" and "dark" are inscribed on the escutcheon plate to show the position the knob must be in to produce these limiting control conditions. A window 89 of some suitable colored glass or plastic material is provided behind the escutcheon plate in order to provide a colored illumination for the curved opening.

As has been previously pointed out, it is one of the objects of this invention to provide an improved signal device for indicating either that the waffle iron is at a cooking temperature or that the waffle is cooked the desired amount. To effect this object, there is provided an illuminating lamp 90 which is arranged to illuminate the dial portion of the escutcheon plate through a colored window 89. Signal devices employing a bulb have been used in the past but they have not been entirely satisfactory due to the fact that they were usually mounted on a bracket which was clamped directly to the waffle iron grid and located in the heated area of the iron. With such a mounting, the life of the ordinary signal lamp was materially reduced due to the high temperatures to which it was subjected and in many instances the temperatures were sufficiently high to require a special bulb. In order to overcome these difficulties, I have provided a construction and arrangement by which the signal lamp is shielded from heat from the waffle unit. Referring to Figs. 1 and 2, it will be observed that the signal lamp is supported in a bracket 91 which is mounted on the base plate 16 so as to lie in the chamber 15 formed in the base assembly. With such a mounting, the lamp 90 is shielded by the casing 14 from a direct radiation of heat from the lower waffle grid heating unit and the bracket is not in contact with the heated grid. This effects a substantial reduction in temperature to which the signal lamp is subjected and increases the life of the signal lamp materially.

The operating circuit for the waffle iron is illustrated in Fig. 7. It is to be observed that the upper and lower units of the iron are connected in series and the signal lamp 90 is connected in series with these two units but is shunted by the contacts of the temperature responsive control device. Thus, when the waffle iron reaches the predetermined desired temperature either initially or after a waffle has been cooked, opening of the contacts of the control device by the temperature responsive element causes the shunt to be removed from the signal lamp and the lamp to be thereby illuminated. The resistance of the lamp 90 is high in comparison with the resistance of the units of the upper and lower grids. Thus, although the circuit is completed through these units, the wattage output of the units will be negligible when the lamp is energized.

Mounted on the casing 14 at the hinge or rear portion of the waffle iron, as shown in Figs. 1 and 2, are terminal studs 92 which are insulated from the casing by means of a pair of mica washers 93. The electrical leads are connected to these terminal studs, as shown in Fig. 7, and provided in the side wall 11 of the base opposite the end of the terminal studs is an opening 94 through which the plug of a suitable cord set (not shown) is adapted to pass in order to connect the terminals to a suitable source of supply.

In Figs. 8-10, I have shown a modified form of my invention and the particular feature of this modification is that a control device is adapted to be assembled as a unitary structure which can be readily applied to the lower grid of the waffle iron. It has been found that when the waffle grids are made from pressure molded castings, the bosses used in the modifications shown in Figs. 1-5 for supporting the control on the waffle grid are quite satisfactory since the bosses can be held to the necessary tolerances in the pressure molding operation. However, it has been found that when permanent molded castings are employed, it is necessary to machine the bosses since the permanent molded casting cannot be held to as close tolerances as the pressure molded casting. Thus, in order to eliminate the need for molding supporting bosses to the waffle grid when permanent molded castings are used, I have provided a unitary bracket 95 upon which all of the operating elements of the control device are adapted to be supported and which in turn is mounted on the lower waffle grid by means of a pair of screws 96. The elements of the control device used in this modified form of my invention are substantially the same as those described above and the same numerals are used to identify parts already described. Referring to Figs. 9 and 10, however, it will be observed that the unitary supporting bracket 95 is provided with a horizontal base portion 97 which is adapted to rest against the bottom of the waffle grid and with a vertically extending wall 98 which is provided with an opening 99 by which the bimetallic element 38 may secured in its operative position. Provided at one end of the bracket is a vertically extending flange 100 which is adapted to receive threadedly a support and adjustable screw 101 upon which is mounted a stop 102 which functions in a manner similar to the stop 80 described above. In addition, the bracket 95 is provided with a pair of flange members 103 which are arranged to support the shaft supporting bracket 70 and provided in the lower surface of the bracket 97 is a channel-shaped portion 104 which is adapted to receive the leg portions 62 and 63 of the cam member in order to prevent relative rotation thereof with respect to the shaft 68. This channel-shaped member functions in the same manner as the bosses 76 described in connection with the modification shown in Figs. 1-5.

It is apparent that with the form of my invention shown in Figs. 8-10, the control device may be assembled as a unit on the single supporting bracket shown in Figs. 9 and 10 and the unitary assembly then applied to the waffle grid by means of the screws 96. In this way all special molding and machining operations of the waffle grid are eliminated and the control device may be readily assembled and easily applied to the waffle grid so as to produce an accurately operating and inexpensive control therefor.

It is believed that the operation of my improved waffle iron control is apparent from the foregoing detailed description. However, again briefly considering the operation of the control, it will be assumed that the parts are in the relative positions shown in Fig. 2 and that the electrical terminals 93 have been connected to a suitable source of supply. The upper and lower heating units of the waffle iron will then be energized and the waffle grids will be heated. When the predetermined desired temperature of the waffle grids is obtained in accordance with the setting of the adjusting knob 84, the bimetallic element 38 will have deflected to the left to the position shown in Fig. 3 and the contact 41 will be moved away from the contact 52. As shown in Fig. 7 this movement of the contact members has the effect of removing the shunt from the signal lamp 90 and a signal is thus given that the waffle iron has reached the desired cooking temperature. At the same time the wattage output of the upper and lower heating units is reduced to a negligible quantity as previously described so that further heating of the waffle iron is prevented.

When the waffle iron has reached the predetermined desired temperature, the lid will be raised and the waffle batter placed on the lower grid and then the lid closed. The pouring of the waffle batter on the lower waffle grid has the effect of cooling this grid to such a degree that the bimetallic element is deflected to the right so that the contacts 41 and 52 are closed. When this takes place, the signal lamp is shunted and the upper and lower heating units for the upper and lower grids are subjected to their full operating voltage so that heating of the waffle grids will again take place. As the waffle batter cooks, the temperature of the waffle grids rises. When the batter has been cooked the desired amount to produce a light or dark waffle acording to the setting of the control knob, the temperature of the lower grid will have risen sufficiently to cause the bimetallic element to deflect to the left opening contacts 41 and 52. Under these circumstances the signal device 90 is energized and a visible indication is given the user that the waffle has been cooked and is ready for removal. At the same time the wattage output of the heating unit is substantially reduced so that the cooking of the waffle after operation of the control is slight.

If more than one waffle is to be cooked, the cooking operations will be repeated and the operation of the control and signal device in each succeeding cooking period will be substantially as described above. If it is desired to change the degree of cooking of a particular waffle and thereby change its color, it is necessary merely to move the adjusting knob in the appropriate direction to give the result which is desired.

If it should be desired to discontinue cooking or heating of the waffle iron during its use while still maintaining the iron connected to its source of supply, this may be done by rotating the knob 84 counterclockwise, as shown in Fig. 6. This has the effect of moving the contact arm 44 against the stop 80 so that the contact 52 will be moved away from the contact 41 as shown in Fig. 4. In this way, the shunt of the signal lamp will be removed and the wattage output of the heater units for the iron will be reduced to a negligible amount so that substantially no heat will be transmitted to the waffle grid.

While I have described my invention with particular reference to an electric waffle iron, it is readily apparent that the control and signal arrangement which forms the subject matter of this invention may be used in other types of domestic cooking appliances and I, therefore, do not intend to be limited to the particular adaptation of my improved control arrangement illustrated but intend by the appended claims to cover all modifications which are in the true spirit and scope of my invention.

What I claim as new and desire to secure by Letters Patent of the United States, is:

1. An adjustable thermostatic switch comprising a temperature responsive element adapted to deflect in accordance with temperature changes thereof, a pair of contact members, a resilient arm for supporting one of said contact members so that it is relatively movable with respect to the other contact members, means on said resilient arm adapted to be engaged by said temperature responsive element so that said arm is moved in accordance with the deflection of said element to cause said contact members to be operated to a different circuit controlling position, a hairpin-shaped member having a slotted curved portion and a pair of leg portions, means for securing said contact members to said leg portions, a rotatably mounted shaft extending through said curved portion, a pin on said shaft adapted to cooperate with the slot in said curved portion so that rotation of said shaft will cause translation of said hairpin-shaped member and move said contact members closer to or farther away from said temperature responsive element whereby the temperature setting of said switch may be varied.

2. An adjustable thermostatic switch comprising a temperature responsive element, switch means comprising a relatively fixed contact and a relatively movable contact, means for supporting said contacts in operative relation with respect to each other, means associated with said relatively movable contact member and adapted to be engaged by said temperature responsive element so that said contact member is moved in accordance with deflection of said temperature responsive element, cam means comprising a hairpin-shaped member having a slotted curved portion and a pair of leg portions, means for securing said contact supporting means to said leg portions, a shaft extending through said curved portion, a pin on said shaft adapted to cooperate with the slot in said curved portion so as to cause translation of said cam and said contacts in accordance with rotation of said shaft, said translation of said contacts being effective to produce a different temperature setting of said control device.

AUGUST A. PROPERNICK.